Patented Nov. 1, 1927.

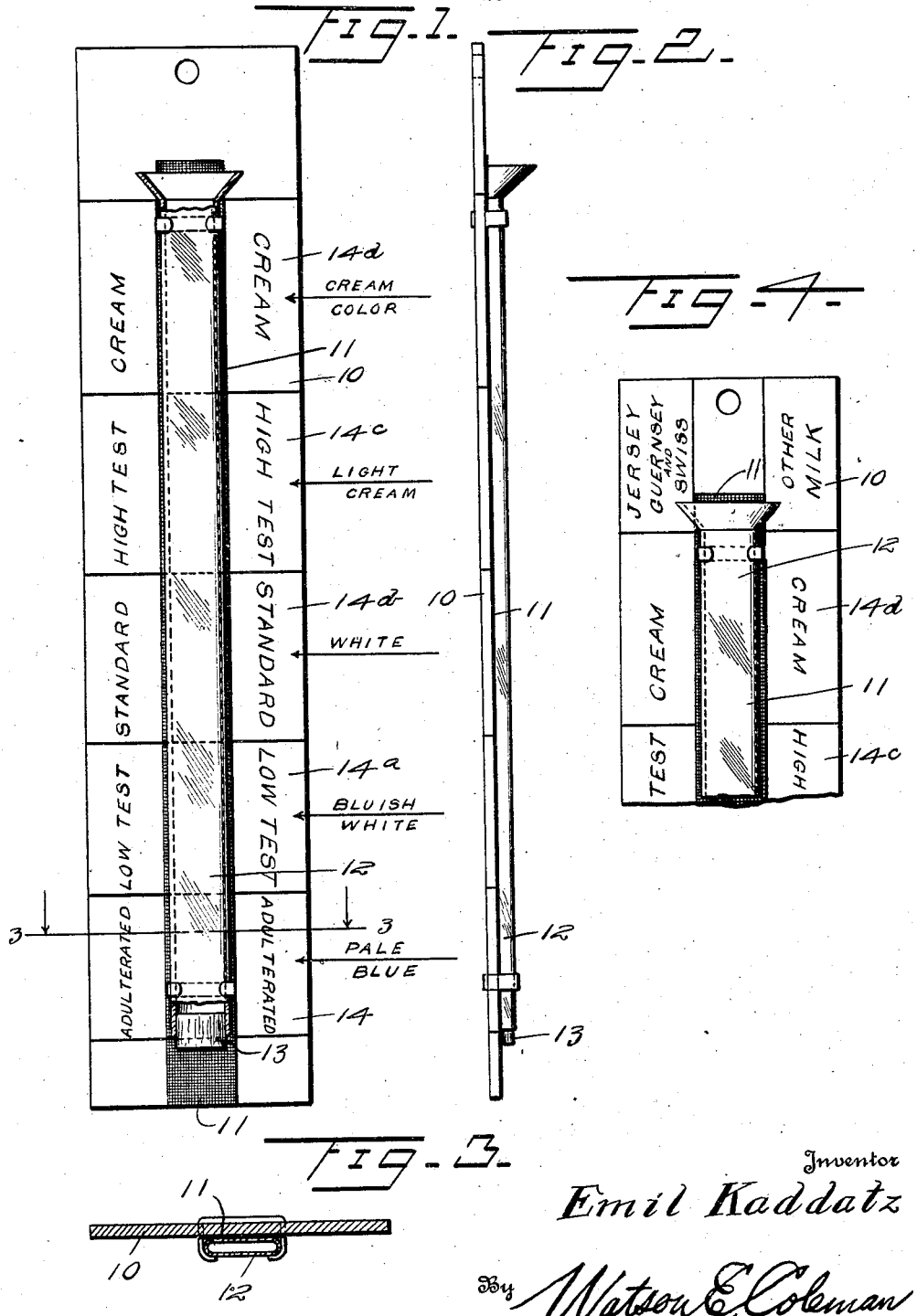

1,647,569

UNITED STATES PATENT OFFICE.

EMIL KADDATZ, OF ORTONVILLE, MINNESOTA.

COLOR-TESTING DEVICE FOR TRANSLUCENT FLUIDS.

Application filed January 28, 1926. Serial No. 84,397.

This invention relates to color testing devices for translucent fluids and more particularly to a device primarily intended for testing the quality of milk.

An important object of the invention is to provide a device of this character which may be very cheaply and readily produced and which will afford a fairly accurate and readily conducted test as to the quality of the fluid.

A further and more specific object of the invention is to provide a device of this character by means of which difference in quality of fluids is accentuated by their association with the chart.

These and other objects I attain by the construction shown in the accompanying drawing, wherein for the purpose of illustration is shown a preferred embodiment of my invention and wherein:—

Figure 1 is a front elevation of a color testing device constructed in accordance with my invention;

Figure 2 is a side elevation thereof;

Figure 3 is a section on the line 3—3 of Figure 1;

Figure 4 is a fragmentary front elevation of a slightly modified tester.

Referring now more particularly to the drawings, the tester includes a backer 10 having a preferably centrally disposed band 11 of color contrasting sharply with the normal color of the fluid which is to be tested. In testing milk and cream, the color employed is preferably black. Upon this band is superimposed a flat tube 12 which may be open at either one or both ends, the latter construction being herein illustrated, the opening at the lower end of the tube being sealed by a removable element 13. With this element removed, the tube may be very readily cleansed. The backer 10 at opposite sides of the tube 12 and band 11 is provided with graduated bands 14, 14$^a$, 14$^b$, 14$^c$, and 14$^d$, each band representing a quality of fluid to be tested and each band exhibiting a color corresponding to the color exhibited by the quality of liquid which it represents when arranged above the black band 11 within the tube 12.

While it is well known that different grades of milk have naturally different colors, the difference in these colors is very hard to detect and the association therewith of a contrasting color in the manner described increases the contrast between different grades, enabling these grades to be more readily detected. This is particularly true in connection with a substance such as milk wherein the element determining the grade of the fluid is substantially opaque and the presence of quantities of this element render the fluid opaque. Adulterated milk, when superimposed upon a black surface in a relatively thin tube, will assume a pale blue color, enabling it to be very readily detected. The color of cream on the other hand is not affected so that the differentiation between the extremes is greatly increased, permitting a wider range of differentiation between the grades lying between these extremes.

In testing milk, the milk is simply inserted in the tube and the quality determined by comparing the color of the milk within the tube with the colors of the bands 14 to 14$^d$. While I have disclosed a simple color band if the tester is to be employed with milk from Jersey, Guernsey and Swiss cows as well as with milk from other cows, a double color band, such as illustrated in Figure 4 will be necessary, as the cows first mentioned give milk differentiating in shade for the same quality.

Since the construction hereinbefore set forth is obviously capable of a certain range of change and modification without materially departing from the spirit of the invention, I do not limit myself to such specific structure except as hereinafter claimed.

I claim:—

1. A color testing device for liquids having a range of grades from opaque to translucent comprising a backer having a color stripe of a color sharply contrasting with the color of the liquid to be tested, a translucent liquid container superimposed upon the stripe and maintaining the liquid in a column of predetermined thickness and a color band associated with said backer and liquid container and having colors corresponding to various grades of the liquids when exposed in said container.

2. A color testing device for liquids having a range of grades from opaque to translucent comprising a backer having a color stripe of a color sharply contrasting with the color of the liquid to be tested, a translucent liquid container superimposed upon the stripe and maintaining the liquid in a column of predetermined thickness and a color band associated with said backer and liquid container and having colors corresponding to various grades of the liquids when exposed in said container, the container being in the form of an elongated tube having its opposite ends open, a removable closure for one end of the tube.

In testimony whereof I hereunto affix my signature.

EMIL KADDATZ.